United States Patent [19]
Barrett et al.

[11] 3,984,190
[45] Oct. 5, 1976

[54] SIMULTANEOUS TRANSMISSION OF PERIODIC SPECTRAL COMPONENTS BY PLURAL INTERFEROMETRIC MEANS

[75] Inventors: Joseph J. Barrett, Morris Plains; M. Alten Gilleo, Morristown, both of N.J.

[73] Assignee: Allied Chemical Corporation, Morris Township, N.J.

[22] Filed: Nov. 26, 1974

[21] Appl. No.: 527,463

[52] U.S. Cl.............................. 356/75; 356/106 S
[51] Int. Cl.² ....................... G01B 9/02; G01J 3/44
[58] Field of Search........................... 356/75, 106 S

[56] References Cited
UNITED STATES PATENTS
3,853,404  12/1974  Barrett............................ 356/106 S OTHER PUBLICATIONS
Barrett et al., "Use of Air Bearings in the Construction of a Scanning Fabry–Perot Interferometer", Applied Optics, vol. 11, Sept. 1972, pp. 2100–2101.
Cooper et al., "Rapid Scanning of Spectral Line Profiles Using an Oscillating Fabry–Perot Interferometer", J. Sci. Instrum., vol. 40, Sept. 1963, pp. 433–437.
Mack et al, "The PEPSIOS Purely Interferometric High–Resolution Scanning Spectrometer," Applied Octics, vol. 2, Sept. 1963, pp. 473–485.

Primary Examiner—Siegfried H. Grimm
Attorney, Agent, or Firm—E. D. Buff

[57] ABSTRACT

A method and apparatus for analyzing light are provided. Light having spectral components periodic in frequency is collected, collimated and transmitted by light conditioning means to a first interferometric means. The first interferometric means selectively separates a preselected periodic spectrum from the light and transmits such spectrum in the form of a fringe having an intensity derived from and substantially equal to the combined intensities of the transmitted spectra. A second interferometric means adapted to receive the fringe transmits the preselected periodic spectrum thereof in the form of a modified fringe providing a detectable signal. The portion of total intensity of the modified fringe derived from the combined intensities of the transmitted spectrum is greater than that of the fringe in the presence of unwanted spectra.

26 Claims, 4 Drawing Figures

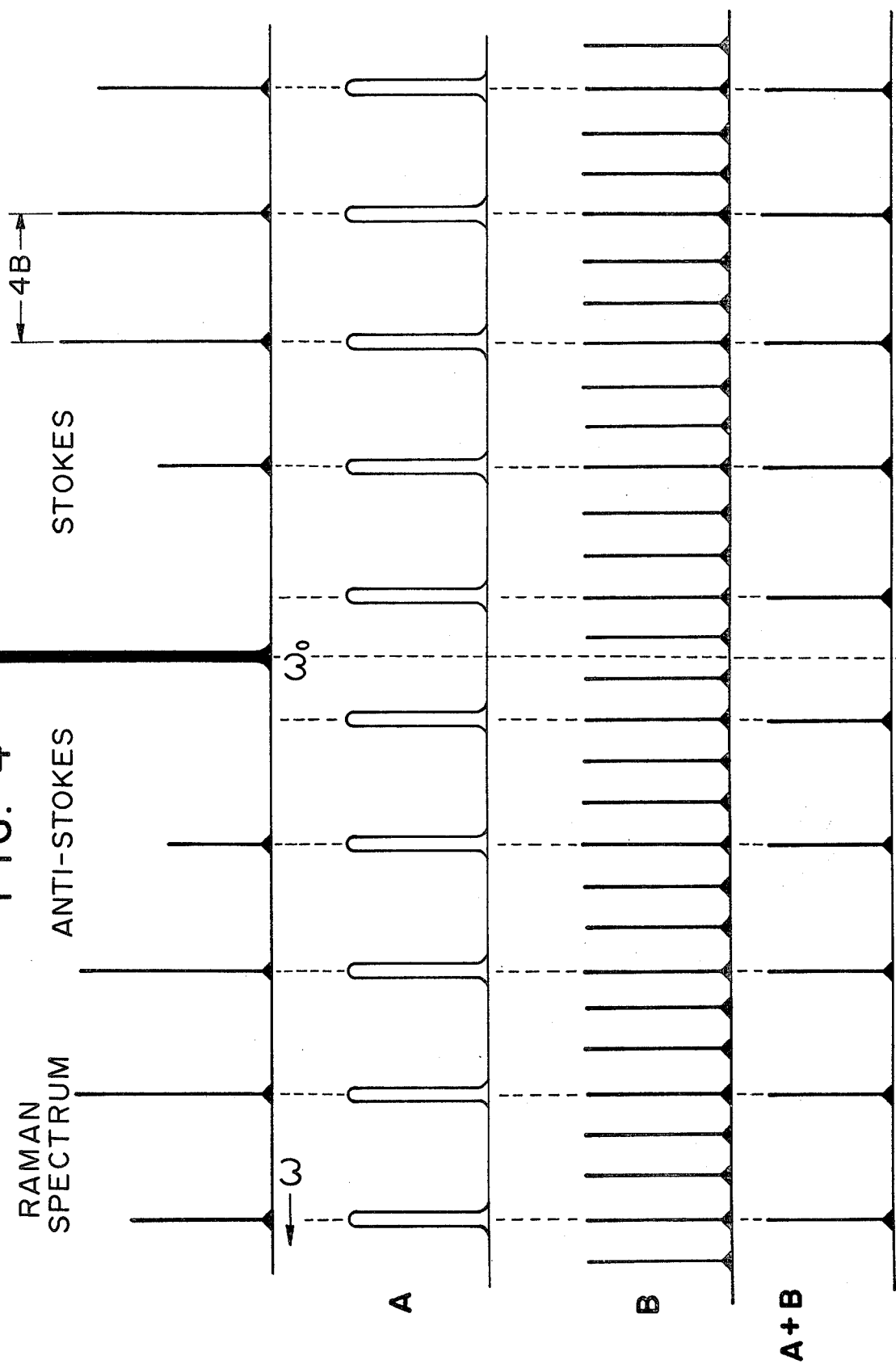

SIMULTANEOUS TRANSMISSION OF PERIODIC SPECTRAL COMPONENTS BY PLURAL INTERFEROMETRIC MEANS

BACKGROUND OF THE INVENTION

1. Field of the Invention

This invention relates to the field of spectroscopy and more particularly to apparatus for detecting and quantitatively measuring gaseous constituents through simultaneous transmission of their periodic spectra.

2. Description of the Prior Art

In apparatus used for spectroscopic gas analysis, light produced by scattering in gas is collected and transmitted to an interferometer scanned to transmit selectively and simultaneously the rotational Raman spectra of a preselected constituent of the gas. The output of the interferometer is converted to a detectable signal and displayed.

One of the major problems with such apparatus is the difficulty of analyzing quantities of gaseous constituents present in the low parts per million range. The output signal from the interferometer represents a relatively low intensity signal that is frequently altered or obscured by spectral interference between rotational Raman spectra of the gaseous constituent being analyzed and spectra of coexistent interfering gases. The problem is particularly troublesome when the gaseous constituent being analyzed is located at a point distant from the apparatus. To alleviate such problems it has been necessary to provide the apparatus with highly sensitive forms and combinations of detectors, sources, filteres, control systems and the like, which are relatively expensive.

SUMMARY OF THE INVENTION

The present invention provides apparatus having increased sensitivity for spectroscopically analyzing light having spectral components periodic in frequency. Such apparatus has light conditioning means for collecting, collimating and transmitting the light. A first interferometric means adapted to receive the light selectively separates a preselected periodic spectrum therefrom and transmits the spectrum in the form of a fringe. Such first interferometric means has interference-producing means for providing a plurality of transmission windows regularly spaced in frequency. The frequency spacing between adjacent windows, or spectral range of the first interferometric means is adjusted to equal substantially the frequency difference between spectral components of the same periodic spectrum and to cause the transmission peaks for adjacent orders to coincide with the spectral lines of the components, whereby the fringe has an intensity derived from and substantially equal to the combined intensities of the spectral lines. A second interferometric means in series with the first interferometric means is adapted to receive the fringe and transmit the spectrum in the form of a modified fringe providing a detectable signal. Such second interferometric means has interference-producing means for providing a plurality of transmission windows regularly spaced in frequency. The frequency spacing between adjacent windows, or spectral range, of the second interferometric means is adjusted so that (1) the ratio of the spectral range of the first interferometric means to the spectral range of the second interferometric means is an odd integer, n, greater than one and (2) the transmission peaks for adjacent nth orders coincide with the spectral lines of the components, whereby the proportion of intensity of the modified fringe derived from the combined intensities of the spectral lines of the spectrum is greater than that of the fringe.

Further, the invention provides a method for spectroscopically analyzing light having spectral components periodic in frequency, comprising the steps of collecting, collimating and transmitting the light; interferometrically separating a preselected periodic spectrum from said light and transmitting said spectrum in the form of a fringe having an intensity derived from and substantially equal to the combined intensities of said spectral lines by directing said light through a first plurality of transmission windows regularly spaced in frequency, the frequency spacing between adjacent windows, or first spectral range, being equal substantially to the frequency difference between adjacent spectral components of the same periodic spectrum and the transmission peaks for adjacent orders coinciding with the spectral lines of the components; interferometrically separating said periodic spectrum from said fringe and transmitting said separated spectrum in the form of a modified fringe providing a detectable signal by directing said spectra of said fringe through a second plurality of transmission windows regularly spaced in frequency, the frequency spacing between adjacent windows, or second spectral range, being such that (1) the ratio of the first spectral range to the second spectral range is an odd integer, $n$, greater than one and (2) the transmission peaks for adjacent $n$th orders coincide with the spectral lines of the components, whereby the proportion of intensity of said modified fringe derived from the combined intensities of said spectral lines of the spectrum is greater than that of said fringe.

Although the light which is sujected to analysis can be received from an external source, it is usually produced by the apparatus. Thus, the apparatus preferably has light source means for generating monochromatic light. A projecting means associated with the light source means directs the monochromatic light through the gaseous material to produce scattered light having spectral components periodic in frequency. Light conditioning means are provided for collecting, collimating and transmitting the scattered light to interferometric means of the type described.

Several known interferometric means may be adapted for use with the above apparatus. Preferably, each of the interferometric means is a Fabry-Perot interferometer (FPI), the first interferometric means having a mirror separation, $d_1$, adjusted to transmit substantially all rotational lines of a preselected molecular species, or constituent, of the gaseous material and the second interferometric means having a mirror separation, $d_2$, adjusted to transmit substantially all of the aforesaid rotational lines and reject interfering rotational Raman lines in the vicinity of the rotational lines of the preselected species. This condition obtains when $$d_1 = \frac{n_1}{8\mu B} \quad \text{and} \quad d_2 = \frac{n_2}{8\mu B}$$

where $d_1$ is the mirror separation of the first FPI, $d_2$ is the mirror separation of the second FPI, $n_1$ and $n_2$ are odd integers, $\mu$ is the index of refraction of the medium between the mirrors, and B is the molecular rotational constant of the species. For a given molecular species, the rotational constant B is a unique quantity. Thus, identification of the species emitting a particular rotational Raman spectrum is made positively by determining the mirror separation of the FPI at which all the rotational Raman lines of the species are simultaneously transmitted. Advantageously, combination of the two FPI's in series produces a larger finesse, that is, much narrower transmission windows for a given spectral range. Moreover, with two FPI's in series the contrast factor is increased. Spectral interference is minimized, the sensitivity of the apparatus is increased and highly sensitive forms and combinations of light sources, filters and control systems are unnecessary. Accordingly, the method and apparatus of this invention permits gaseous constituents to be detected and measured more accurately and at less expense than systems wherein the spectra are transmitted through a single interferometric means.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 4 is a schematic representation of transmission profiles produced by the apparatus of FIG. 1 during analysis of light carrying periodic spectra.

DESCRIPTION OF THE PREFERRED EMBODIMENTS

Light having spectral components periodic in frequency is found in each of the visible, infrared and ultraviolet frequency regions, at intensities sufficient to permit detection of the components. As a consequence, the invention will function with light having a relatively wide range of frequencies. For illustrative purposes, the invention is described in connection with apparatus for measuring rotational Raman spectra of gaseous material scattered by light from the visible frequency region. When applied in this manner, the invention is particularly suited to detect and to measure quantitatively minor constituents of a gaseous material such as air. It will be readily appreciated that the invention can be practiced using light from any of the foregoing frequency regions, and that it can be employed for similar and yet diversified uses, such as the analysis of vibration-rotation spectra, the determination of molecular gas constants and the like.

Figure 1:
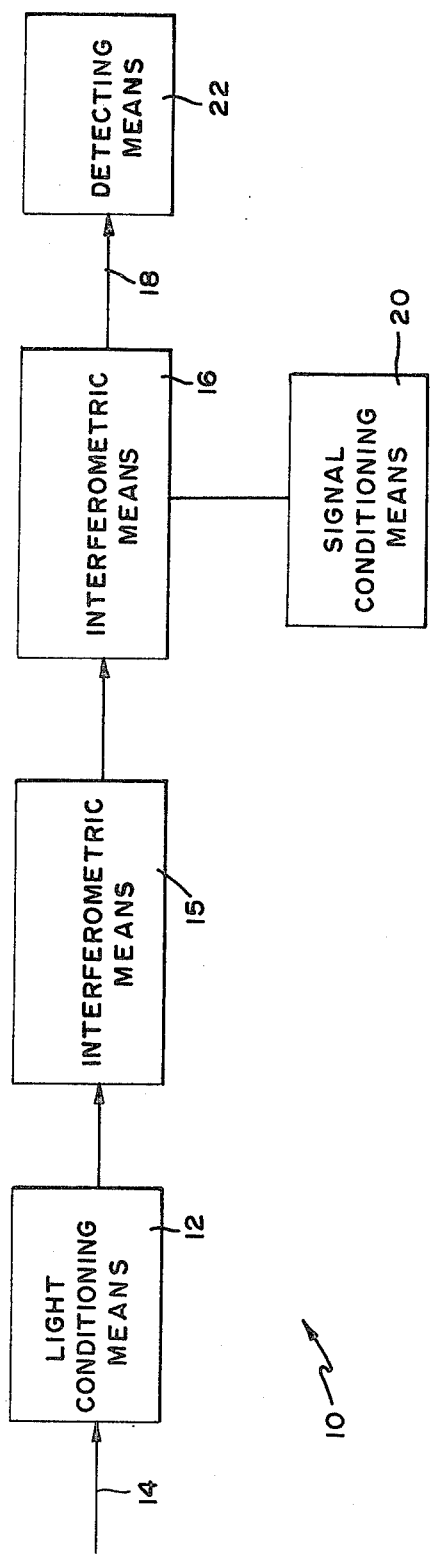
FIG. 1 is a block diagram showing means for increasing the accuracy of apparatus for the simultaneous transmission of periodic spectra.

Referring to FIG. 1 of the drawings, there is shown preferred apparatus for the simultaneous transmission of preselected periodic spectra. In the basic apparatus, shown generally at 10, light conditioning means 12 collect, collimate and transmit light 14 having spectral components periodic in frequency. First interferometric means 15 receives the light 14, selectively separates a preselected periodic spectrum therefrom and transmit the spectrum to second interferometric means 16. The latter further separates the spectrum from the light and transmits the spectrum in the form of a detectable signal 18.

More specifically, first interferometric means 15 is connected in series with and between light conditioning means 12 and second interferometric means 16. First interferometric means 15 receives the light 14, selectively separates therefrom a preselected periodic spectrum, and sends the spectrum in the form of a fringe to second interferometric means 16. The latter receives the fringe and transmits spectrum thereof in the form of a modified fringe which provides a detectable signal 18. Detecting means 22 is adapted to receive the signal 18 and determine the intensity thereof. Signal conditioning means 20 is associated with second interferometric means 16 and detecting means 22. The signal conditioning means 20 has modulating means for modulating the phase difference between interfering rays of light 14 transmitted by the second interferometric means 16 so as to vary the intensity of the fringe transmitted thereby. Signal conditioning means 20 also has synchronous (e.g. phase sensitive) detecting means for detecting the intensity variation of the modified fringe, whereby the modified fringe can be identified by detecting means 22.

Figure 2:
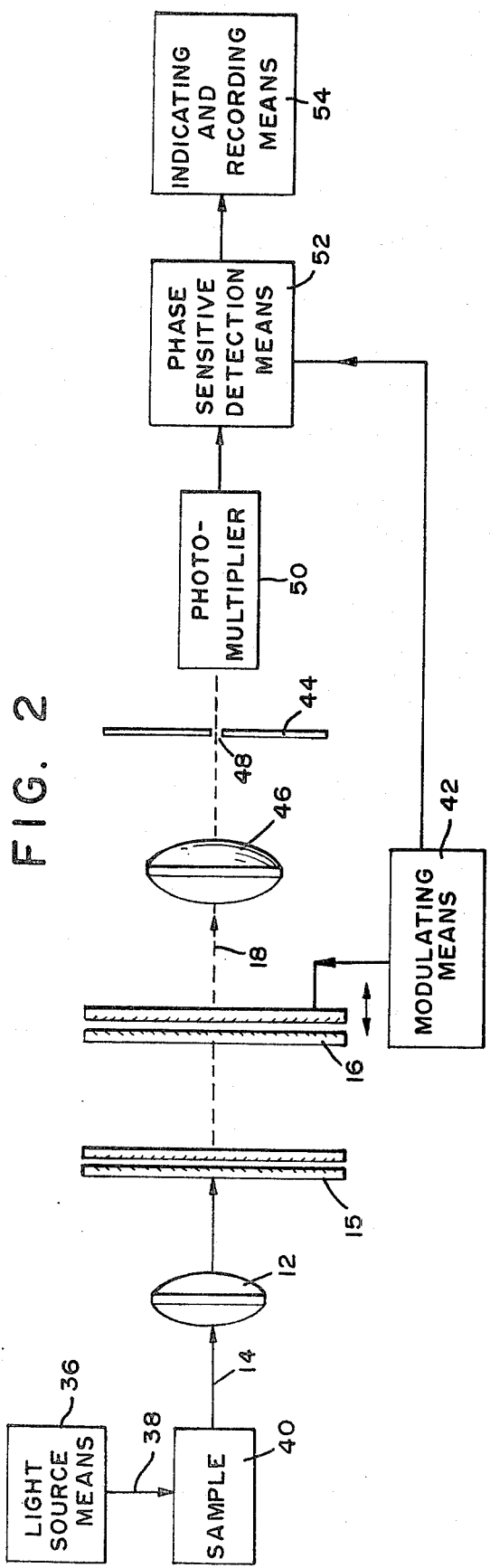
FIG. 2 is a schematic diagram of the means of FIG. 1, including, additionally, means for producing light carrying such spectra.

FIG. 2 schematically shows the apparatus of FIG. 1, including, additionally, means for producing light carrying periodic spectra. As previously noted, the light 14 which is subjected to analysis can be received from an external source. Generally, however, the light 14 is produced by the apparatus 10. Hence, the apparatus 10 has light source means 36, such as a conventional argon ion laser, a frequency doubled, pulsed ruby laser or the like, for generating a highly monochromatic, coherent, collimated beam of radiation. The resolving power of the interferometric means 16 is best utilized when the light source means 36 is provided with means for projecting light having a line width and frequency stability about equal to or less than the instrumental width, described hereinafter in greater detail, of the first and second interferometric means 15, 16.

The use of a pulsed laser as the light source means 36 together with a time gated electronic detection system permits determination of pollutant concentration and location of a sample of gaseous material remote from the apparatus 10. For example, by providing the apparatus 10 with (1) means for measuring the time interval required to send a laser pulse into the sample and receive a return signal caused by light scattered therein and (2) means for measuring the amplitude of the return signal, the distance of the sample from the apparatus 10 as well as the pollutant concentration thereof is readily obtained. A pulsed laser adapted to determine pollutant concentration and location in the above manner preferably has means for projecting light having a line width and frequency stability about equal to or less than the instrumental width of each of the first and second interferometric means associated therewith. Such means typically includes a mode selecting etalon disposed in the laser cavity.

A projecting means associated with the light source means 36, introduces the radiation, schematically represented by ray path 38, into gaseous material in sample compartment 40 in one direction, which will be considered to be substantially vertical for convenience in referencing directions, but may, of course, be in any direction desired. Raman scattered radiation hereinafter referred to as light 14, from the gaseous material in sample compartment 40 is collected, collimated and transmitted to the first interferometric means 15 by light conditioning means 12, which may be a lens, or other suitable optical system. As long as the gaseous material contains (1) molecules which are of the linear or symmetric top variety or (3) slightly asymmetric top molecules which have nearly periodic spectra, the light 14 will exhibit spectral components periodic in frequency.

The first interferometric means 15 has interference-producing means for providing a plurality of transmission windows regularly spaced in frequency. In addition, the first interferometric means 15 can be provided with scanning means for variably controlling the frequency of each other. The interference-producing means is adjusted so that the frequency spacing between adjacent windows substantially equals the frequency difference between adjacent spectral components of a preselected periodic spectrum. Generally such preselected periodic spectrum is that produced by scattering of a minor constituent of the gaseous material as, for example, the rotational Raman spectra of carbon dioxide or carbon monoxide in a sample of air. The scannning means is then adjusted so that the transmission peaks for adjacent orders coincide with the spectral lines of such components. When the first interferometric means 15 is adjusted in the above manner, the preselected spectrum is transmitted therefrom in the form of a fringe and is thereby selectively separated from the light 14. The separated spectrum is transmitted by first interferometric means 15 to second interferometric means 16.

The second interferometric means 16 has interference-producing means for providing a plurality of transmission windows regularly spaced in frequency, and can be provided with scanning means for variably controlling the frequency of each order. Second interferometric means 16 is disposed in series with first interferometric means 15 in the path of the spectrum transmitted thereby. Its interference-producing means is adjusted so that (1) the ratio of the frequency spacing between adjacent windows (spectral range) of the first interferometric means 15 to the corresponding frequency spacing between adjacent windows (spectral range) of the second interferometric means 16 is an odd integer, $n$, greater than one. The scanning means of the second interferometric means is then adjusted so that the transmission peaks for adjacent nth orders coincide with the spectral lines of the components. The separated spectrum is transmitted by the second interferometric means 16 in the form of a modified fringe which provides a detectable signal 18.

The first interferometric means transmits simultaneously all of the spectral lines of the spectrum for the preselected species. Hence, the fringe transmitted by the first interferometric means 15 is derived from a plurality of spectral lines and has an intensity substantially equal to their sum. The second interferometric means 16 also effects simultaneous transmission of all spectral lines of the spectrum for the preselected species and thereby produces a signal having the additive feature produced by the first interferometric means 15. Surprisingly, however, the combination of interferences produced by the first and second interferometric means 15, 16 causes the latter to transmit a modified fringe having a proportion of intensity (derived from the combined intensities of all spectral lines of said spectrum for the preselected species) which is as much as three times greater than that of the fringe transmitted by the first interferometric means 15.

Before describing how the apparatus of FIG. 2 can be used to determine the intensity of signal 18, it would be helpful to explain the construction and operation of the first and second interferometric means 15 and 16. The transmission function of an FPI ($I_t/I_0$) is given by the Airy formula $$(I_t/I_0) = T^2[1+R^2-2R\cos\phi]^{-1} = \frac{T^2}{(1-R)^2}[1+F\sin^2\frac{\phi}{2}]^{-1}, \quad (1)$$

where $T + R + A = 1$, $I_0$ is the intensity of the incident light and the phase difference $\phi$ is expressed as $\phi = 4\pi\mu\omega d$ for rays normal to the FPI mirrors. The symbols A, R and T represent, respectively, the absorbance, reflectance and transmittance of the FPI mirrors; $\mu$ is the refractive index of the medium between the FPI mirrors; $d$ is the FPI mirror separation; $\omega$ is the frequency of the incident light expressed in wavenumbers. The parameter F in equation (1) is defined by the equation.

$$F = \frac{4R}{(1-R)^2}. \quad (2)$$

The transmission maxima for $I_t$ occur when the condition for constructive interference is satisfied, i.e., the phase difference $\phi$ must be an integral multiple of $2\pi$, viz., $$\phi = 2\pi m \quad (3)$$

or $$m = 2\mu\omega d \quad (4)$$

where $m$ is the order of interference. The transmission maxima for $I_t$ are referred to in the specification and claims as transmission windows. For a specific value of the mirror separation, $d$, the FPI provides a plurality of transmission windows regularly spaced in frequency. The frequency spacing, $\Delta\omega$, between adjacent windows (or spectral range) of the FPI is $$\Delta\omega = (2\mu d)^{-1}. \quad (5)$$

By varying the mirror spacing, $d$, of the FPI, $\Delta\omega$ can be adjusted to equal substantially the frequency difference between adjacent spectral components of a specific periodic spectrum. The finesse, N, of the FPI is equal to the ratio of the spectral range ($\Delta\omega$) to the full width of the transmission window at half transmission points. The finesse is equal to $$N = \frac{\pi\sqrt{F}}{2} = \frac{\pi\sqrt{R}}{1-R}. \quad (6)$$

Consider the case of two Fabry-Perot interferometers in series, one of the interferometers having a small mirror spacing $d_1$ and the other having a large mirror spacing $d_2$ such that $$d_1/d_2 = n_1/n_2 \quad (7)$$

where $n_1$ and $n_2$ are odd integers with $n_1 < n_2$. For simplicity, it is assumed that $n_1 = 1$ and $n_2 = n$. Equation (7) may be written as $$d_2 = nd_1 \qquad (8)$$

where $n$ is an odd integer. The transmission of a rotational Raman spectrum by two series FPI's with $n = 3$ is shown schematically in FIG. 4. The transmission of the first and second interferometers and the combined transmission of the interferometers in series is represented in FIG. 4 by transmission profiles A, B and $A + B$, respectively. Using equation (1) and neglecting the absorption losses of the Fabry-Perot Mirrors, the combined transmission, $T_c$, for the two series connected FPI's may be written as $$T_c = (I_t/I_0)_1 (I_t/I_0)_2$$
$$= [1 + F_1 \sin^2 \frac{\phi_1}{2} + F_2 \sin^2 \frac{\phi_2}{2} + F_1 F_2 \sin^2 \frac{\phi_1}{2} \sin^2 \frac{\phi_2}{2}]^{-1} \qquad (9)$$

where, for generality, it is assumed that the finesse of the interferometers is not the same. The parameter $F$ is given by equation (2) and the phase difference $\phi$ is defined by $\phi = 4\pi\mu\omega d$. Using equation (7) and letting $\theta = \phi/2$, equation (9) may be written as $$T_c = [1 + F_1 \sin^2\theta_1 + F_2 \sin^2 n\theta_1 + F_1 F_2 \sin^2\theta_1 \sin^2 n\theta_1]^{-1} \qquad (10)$$

The maximum values of $T_c$ occur for values of $\theta = m\pi$ where $m$ is an integer. For these values of $\theta_1$, $T_c(\max)$ is unity. The frequency separation ($\Delta\omega$) between two adjacent maximum values of $T_c$ may be determined as follows:

$$(m+1)\pi - m\pi = 2\pi\mu\omega' d_1 - 2\pi\mu\omega'' d_1 = 2\pi\mu d_1(\Delta\omega_1) \qquad (11)$$

where $\Delta\omega_1 = \omega' - \omega''$ is the spectral range of the first interferometer with mirror spacing $d_1$, i.e., $$\Delta\omega_1 = (2\mu d_1)^{-1}. \qquad (12)$$

Therefore the use of the two interferometers in series results in a spectral range equal to the spectral range of the interferometer with the smaller mirror spacing. The minimum transmission value of $T_c$ [equation (10)] occurs for values of $\theta_1 = m\pi/2$, where $m$ is an integer. Hence equation (10) yields $$T_c(\min) = [1 + F_1 + F_2 + F_1 F_2]^{-1}. \qquad (13)$$

The contrast, $C$, of the series interferometers is defined by the equation $$C = \frac{T_c(\max)}{T_c(\min)} = [1 + F_1 + F_2 + F_1 F_2]. \qquad (14)$$

In the immediate region of a transmission maximum, the approximation $\sin\theta \approx \theta$ is valid and equation (10) becomes $$T_c = [1 + F_1\theta_1^2 + n^2 F_2 \theta_1^2 + n^2 F_1 F_2 \theta_1^4]^{-1}. \qquad (15)$$

If we let $\beta = \theta^2$, then equation (15) may be written as $$T_c[1 + (F_1 + n^2 F_2)\beta + n^2 F_1 F_2 \beta^2] = 1. \qquad (16)$$

Solving equation (16) for $\beta$ yields $$\beta = \frac{[(F_1 + n^2 F_2)^2 - 4n^2 F_1 F_2(1 - T_c^{-1})]^{1/2} - (F_1 + n^2 F_2)}{2n^2 F_1 F_2}. \qquad (17)$$

Since $\beta = \phi_1^2/4$, equation (17) is an expression describing the behavior of the phase difference in the immediate region of a transmission window of the two series interferometers. At the transmission peak, $\beta = 0$ and the value of $T_c$ derived from equation (17) is unity.

The combined finesse, $N_c$, of the two series interferometers is determined as follows: At the half transmission points, $T_c = 0.5$, and equation (17) yields $$\beta_{1/2} = \frac{(F_1^2 + n^4 F_2^2 + 6n^2 F_1 F_2)^{1/2} - (F_1 + n^2 F_2)}{2n^2 F_1 F_2}. \qquad (18)$$

To further simplify this analysis, it is assumed that the finesse of each interferometer is the same, i.e., $F_1 = F_2 = F$. Under such conditions, $$\beta_{1/2} = \frac{(1 + n^4 + 6n^2)^{1/2} - (n^2 + 1)}{2n^2 F}. \qquad (19)$$

Expressing equation (19) in terms of the phase difference $\phi_{1/2}$, produces the equation $$\phi_{1/2} = 2\left[\frac{(1 + n^4 + 6n^2)^{1/2} - (n^2 + 1)}{2n^2 F}\right]^{1/2}. \qquad (20)$$

Since $$\frac{\phi_{1/2}}{2\pi} = \frac{1/2\delta_c}{\Delta\omega_1}, \qquad (21)$$

where $\delta_c$ is the full width of the transmission window at half transmission points for the series interferometers, by definition, $$N_c = \frac{\Delta\omega_1}{\delta_c} = \frac{\pi}{\phi_{1/2}}. \qquad (22)$$

Hence the combined finesse, $N_c$, is $$N_c = \frac{\pi}{2}\left[\frac{(1 + n^4 + 6n^2)^{1/2} - (n^2 + 1)}{2n^2 F}\right]^{-1/2}. \qquad (23)$$

For a mirror reflectivity of 0.95, the parameter $F$ [equation (2)] has a value of 1520. From equation (6), the finesse of each individual interferometer is equal to 61.2. For $n = 3$, the overall finesse [equation (23)] for the two series interferometers is 201.5. The contrast factor for each individual interferometer may be obtained from equation (1) with the result that $$C = 1 + F. \qquad (24)$$

In the above example, $F = 1520$ and hence a contrast factor of 1521 is obtained. From equation (14), with $F_1 = F_2 = F$, the contrast for the series interferometers is equal to $(1 + 2F + F^2)$ and for $F = 1520$, $C = 2,313,441$. This large contrast is useful for detecting very low intensity spectral components in the presence of large intensity spectral components. Therefore the combination of two interferometers in series results in a high finesse, high resolution instrument with a large contrast factor.

A computer program was used to estimate the effectiveness of the series-connected interferometers for rejecting unwanted spectra. The calculation was performed in connection with detection of rotational Raman scattering from a small amount (300 ppm) of carbon monoxide in air. For a given molecular species with a rotational constant B and a centrifugal distortion constant D, the frequencies of the rotational Raman lines are $$\omega_R = \omega_0 \mp (4B - 6D)(J + 3/2) \pm 8D(J + 3/2)^3 \quad (25)$$

where $\omega_0$ is the laser exciting frequency, $J$ is the rotational quantum number and the upper and lower signs refer to Stokes and anti-Stokes scattering, respectively. The peak intensity for Stokes-shifted rotational Raman lines is $$I(J)_s \propto \left[\frac{3(J+1)(J+2)}{2(2J+3)}\right] \omega_R^4 g_J \exp\left[-(BJ(J+1)-DJ^2(J+1)^2)hc/kT\right] \quad (26)$$

with a similar expression for anti-Stokes shifted lines. The calculated Raman intensities were multiplied by factors proportional to the scattering cross-section and concentration for oxygen, nitrogen and carbon monoxide.

For each rotational Raman line, the intensity transmitted by each interferometer was calculated using equation (1) and the intensity transmitted by the series interferometers was determined by using equation (9). The total transmitted intensity, in each case, was found by adding the transmitted intensities for all the individual Raman lines. This calculation is only approximate since the peak intensities of the individual Raman lines were used rather than the broadened line profiles.

The first interferometer was specified so that its spectral range was approximately equal to 4B for CO with transmission windows exactly located at the most intense ($J=6$) Stokes and anti-Stokes lines for CO. This occurred for an optical path ($\mu d$) equal to 0.0650402 cm. The second interferometer was specified so that its spectral range had a value equal to one fifth the spectral range of the first interferometer and its optical path ($\mu d$) was equal to 0.325201 cm. The values of the transmission functions of equations (1) and (9) will change as the phase difference $\phi$ is varied. Since $\phi =$ $4\pi\mu\omega d$, the transmission value will change when either the refractive index $\mu$, the light frequency $\omega$ or the mirror separation $d$ is varied. For the purpose of calculation, the scanning was achieved by keeping the optical paths ($\mu d$) of both interferometers fixed and varying the laser frequency $\omega_0$. Experimentally this condition could be realized by using a tunable dye laser as the excitation source along with fixed spacing solid Fabry-Perot etalons. The laser frequency for transmitting the CO signal was calculated to be 19430.29 cm$^{-1}$. The calculations were performed for two other frequencies on both sides of $\omega_0$, viz., $\omega_- = \omega_0 - 0.25$ cm$^{-1}$ and $\omega_+ = \omega_0 + 0.25$ cm$^{-1}$. The results are shown below in Table I.

TABLE I

Summary of Calculations of Relative Signal in Detection of 300 ppm of CO in Air by Using a Single Etalon and Two Etalons in Series.

| | Excitation Frequency | CO Signal | Air Signal | Ratio of CO to Air Signals |
|---|---|---|---|---|
| Etalon I only(Spectral Range ≃ 4B) | $\omega_0$ | 0.775 | 13.31 | 0.058 |
| | $\omega_-$ | 0.093 | 21.57 | 4.31×10$^{-3}$ |
| | $\omega_+$ | 0.0742 | 22.16 | 3.35×10$^{-3}$ |
| Etalon II only(Spectral Range ≃ 4B/5) | $\omega_0$ | 0.502 | 83.0 | 6.05×10$^{-3}$ |
| | $\omega_-$ | 8.75×10$^{-3}$ | 72.8 | 1.20×10$^{-4}$ |
| | $\omega_+$ | 5.85×10$^{-3}$ | 75.3 | 7.77×10$^{-5}$ |
| Etalon I + Etalon II | $\omega_0$ | 0.452 | 0.0977 | 4.63 |
| | $\omega_-$ | 4.62×10$^{-3}$ | 0.1471 | 0.031 |
| | $\omega_+$ | 2.53×10$^{-3}$ | 0.1495 | 0.017 |

For etalon I, the CO-to-air signal ratio is 0.058 at the exciting frequency $\omega_0$, whereas the corresponding ratios for etalon II and the series combination of etalons I and II are 6.05 × 10$^{-3}$ and 4.63, respectively. Therefore the series etalon combination offers improvements in the CO-to-air signal ratio by factors of 79.8 and 761.5 in comparison to the use of etalon I or etalon II alone.

In the preceding example for carbon monoxide, the relationship between the mirror spacings for the series connected interferometers is given by equation (8) with $n = 5$. In general, however, the mirror spacings for the series connected interferometers are related according to equation (7), viz., $d_1/d_2 = n_1/n_2$ where $n_1$ and $n_2$ are odd integers with $n_2 > n_1$. For this general case, the combined transmissions, $T_c$, for the series connected interferometers is given by equation (9) with the phase differences $\phi_1$ and $\phi_2$ obeying the equation $$\phi_2 = \frac{n_2}{n_1}\phi_1. \quad (27)$$

Since $n_2 > n_1$, an upper limit on the value of $n_2$(relative to $n_1$) may be established by requiring that the spectral range ($\Delta\omega_2$) of the second interferometer be greater than the full width at half transmission points ($\delta_1$) of the first interferometer. The finesse of the firsit interferometer is (by definition) equal to $$N_1 = \frac{\Delta\omega_1}{\delta_1}, \quad (28)$$

and using equation (6), $N_1$ is also equal to $$N_1 = \frac{\pi \sqrt{F_1}}{2} = \frac{\pi \sqrt{R_1}}{1-R_1}. \tag{29}$$

From equations (28) and (29), the transmission width, $\delta_1$, of the first interferometer is $$\delta_1 = \Delta\omega_1/N_1 = \frac{2\Delta\omega_1}{\pi \sqrt{F_1}} = \frac{\Delta\omega_1(1-R_1)}{\pi \sqrt{R_1}}. \tag{30}$$

since $\Delta\omega_1 = (2\mu d_1)^{-1}$, equation (30) becomes $$\delta_1 = (\pi\mu d_1 \sqrt{F_1})^{-1} = \frac{1-R_1}{2\pi\mu d_1 \sqrt{R_1}}. \tag{31}$$

The spectral range for the second interferometer ($\Delta\omega_2$) is given by the equation $$\Delta\omega_2 = (2\mu d_2)^{-1} = \frac{n_1}{2\mu n_2 d_1}. \tag{32}$$

The upper limit on the value of $n_2$, namely $(n_2)$max, may be obtained by equating equations (31) and (32). The result is $$(n_2)_{max} = n_1 \left(\frac{\pi \sqrt{F_1}}{2}\right) = n_1 \left(\frac{\pi \sqrt{R_1}}{1-R_1}\right) = n_1 N_1. \tag{33}$$

Therefore, the upper limit on the value of $n_2$ is equal to the product of $n_1$ and the finesse of the first interferometer, $N_1$.

In the event that light projected by light source means 36 in ray path 38 is plane polarized, a further reduction of the background caused by Rayleigh scattering can be achieved by positioning polarizing means, such as a polarizing element, in light path 14 so as to minimize the transmission of Rayleigh scattered light. With this configuration of the polarizing means, the Rayleigh scattered light passed through the polarizing means is reduced to a degree described by the depolarization ratio thereof. Since the Rayleigh depolarization ratio of light produced by scattering in gases such as oxygen and nitrogen is about 1 percent, the polarizing means operates to reduce the intensity of the Rayleigh light transmitted to the interferometric means by a factor of about 100. The pure rotational Raman scattered light from sample 40 is depolarized and hence passes through the polarizing means with a substantially smaller reduction in intensity, as in the order of about a factor of 2.

As previously noted, modulating means 42 is associated with second interferometric means 16 for modulating the phase difference, $\phi$, so as to vary the intensity of the transmitted fringe. The modulating means 42 can, alternatively, be associated with the first interferometric means 15, or with each of the first and second interferometric means 15 and 16. In order to obtain the maximum modulated signal from the fringe appointed for detection, the modulating range is adjusted to approximately one-half the frequency width of the modified fringe. The modulating range can, alternatively, be restricted to preselected portions of the modified fringe in order to increase the intensity of the modulated signal. Generally speaking, the modulating range should be no greater than the frequency spacing between adjacent orders. The phase difference, $\phi$, varies in direct proportion to the product of the optical path, $\mu d$, and the frequency of the input light 14 to be analyzed. Hence, the frequency of the input light can be varied instead of the optical path to modulate the phase difference $\phi$ and alter the intensity of the transmitted fringe. This may be accomplished by use of a light source means such as a tunable dye laser or an optical parametric oscillator.

The resultant signal 18 from the second interferometric means 16 is collected and focused in the plane of pinhole stop 44 by a lens 46. Lens 46 is adjusted so that the center of the signal 18 is positioned on the pinhole 48. The intensity of the portion of signal 18 passing through the pinhole 48 is detected by a photomultiplier 50. A phase sensitive detection means 52, such as a lock-in amplifier, is adapted to receive the signal from the photomultiplier 50 and detect the intensity variation of the modified fringe appointed for analysis. The output of the phase sensitive detection means 52 is displayed by an indicating and recording means 54, which can comprise an oscilloscope and a chart recorder.

Figure 3:
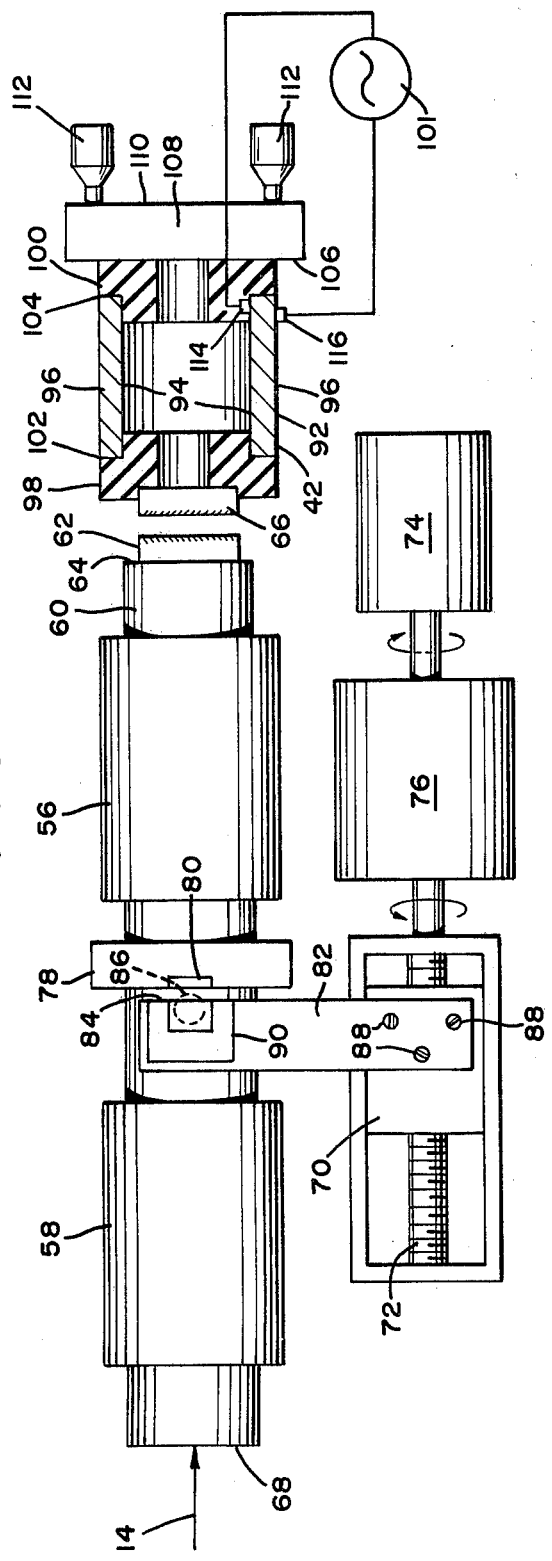
FIG. 3 is a side view, partially cut away, showing means for modulating the second interferometric means of FIGS. 1 and 2.

In FIG. 3, the second interferometric means 16 and the modulating means 42 are shown in greater detail. The second interferometric means shown is a Fabry-Perot interferometer (FPI) which is scanned by varying the phase difference, $\phi$, between interfering beams of light 14 in a conventional way. Scanning methods such as those wherein the pressure of gas between the mirrors of the FPI is altered so as to change the optical path therebetween can also be used. Accordingly, second interferometric means 16 shown in FIG. 3 should be interpreted as illustrative and not in a limiting sense. Preferably each of the first and second interferometric means 15 and 16 is an FPI and is constructed in the same manner. Thus, the first interferometric means 15 is constructed in the same manner as the second interferometric means 16 described hereinafter in more detail. Such means has cylindrical air bearings 56 and 58 which normally operate at about 30 psi and collectively support a hollow metal cylinder 60 approximately 35 cm. long and constructed of stainless steel or the like. The outer diameter of the cylinder 60 is centerless ground to about 4 cm. The inner diameter of the cylinder 60 is about 3.5 cm. Each of the air bearings 56 and 58 is about 8 cm. long and has outer and inner diameters of about 5 cm. and about 4 cm., respectively. The separation between centers of the air bearings is approximately 20 cm. One of the mirrors 62 of the first interferometric means 16 is fixedly mounted on end 64 of cylinder 60 as by a suitable adhesive or the like. The plane surface of the mirror 62 is substantially perpendicular to the rotational axis of the cylinder. The other mirror 66 is fixedly mounted to the modulating means 42 as hereinafter described. Each of the air bearings 56 and 58 rests in precise v-blocks of a base plate (not shown) treated so as to dampen external vibrations. The light 14 to be analyzed enters the second interferometric means 16 at end 68 of cylinder 60. A carriage 70 caused to move horizontally by means of a precision screw and having a coupling arm 82 fixedly secured thereto by mechanical fastening means, such as screws 88, and to cylinder 60 as described hereinafter provides the cylinder 60 with the linear motion needed to scan the first interferometric means 16. Precision screw 72 is coupled to a digital stepping motor 74 through gear assembly 76. The scan rate of the interferometer is controlled either by changing the gear ratio of assembly 76, as by means of magnetic clutches or the like, or by varying the pulse rate input to the digital stepping motor 74. With apparatus of the type described, the scan rate can be varied over a range as great as $10^6$ to 1 or more.

In order to transmit precisely the linear motion to cylinder 60, a collar 78 having glass plate 80 adhesively secured thereto, is fixedly attached to the cylinder 60. The coupling arm 82 has a ball 86 comprised of stainless steel, or the like, associated with an end 84 thereof. A permanent magnet 90 is attached to end 84 of coupling arm 82 near the ball 86. Due to the magnetic attraction between the collar 78 and the magnet 90, the ball is held in contact with the glass plate 80. A low friction contact point is thereby provided. The contact force produced at such contact point by linear movement of the carriage 70 can be adjusted either by varying the separation between the magnet 90 and the collar 78, or by decreasing the strength of the magnet 90.

A sectional view of one form of modulating means 42 is shown in FIG. 3. Other forms of the modulating means 42 can also be used. Preferably, the modulating means 42 has a hollow cylindrical body 92 of piezoelectric ceramics. The inner and outer wall 94 and 96 of the cylindrical body 92 are coated with an electrically conductive material such as silver or the like.

Insulating members 98 and 100 comprised of an insulating material such as ceramic or the like are secured to the cylindrical body 92, at ends 102 and 104, respectively, by a suitable adhesive such as an epoxy resin. Mirror 66 is fixedly attached to insulating member 98 by an adhesive of the type used to secure mirror 62 to the end 64 of cylinder 60. In order that mirror 66 be maintained in parallel with mirror 62, the insulating member 100 is adhesively secured to face 106 of holding member 108. The outer face 110 of the holding member 108 has connencted thereto a plurality of differential screw micrometers 112, which can be adjusted in the conventional way to provide for precise angular alignment of the mirror 66. Electrodes 114 and 116 are attached to the inner wall 94 and the outer wall 96, respectively. Voltage having a wave form such as a sine wave or a square wave impressed thereon is applied from a high voltage low current power supply 101 to the electrodes 114 and 116. Upon application of the voltage the cylindrical body 92 is caused to modulate in a linear direction, whereby the intensity of signal 18 is varied. When the voltage applied from power supply 101 to electrodes 114 and 116 has the form of a square wave, the voltage limits of the wave form can be adjusted so that the intensity of the modified fringe to be detected from signal 18 alternates between its maximum and minimum values. A synchronous detection means is provided for determining the difference in photon count between the maximum and minimum values of the modified fringe for each cycle of the square wave to produce a signal count and accumulating the signal count for a preselected period of time over a preselected number of cycles of the square wave, the preselected time period and preselected number of cycles varying inversely with the intensity of said modified fringe. As a result, the accuracy of the detecting means and hence the sensitivity of the apparatus 10 is increased by a factor in the order of about 100 or more.

The apparatus 10 which has been disclosed herein can, of course, be modified in numerous ways without departing from the scope of the invention. For example, each of the first and second interferometric means 15 and 16 can be a fixed etalon tuned by controlling the temperature thereof. One type of fixed etalon which is suitable is comprised of optically transparent material, such as fused silica, having opposed surfaces which are polished, flat, parallel and coated with silver, dielectric material or the like for high reflectivity at a preselected frequency region. The thickness of the etalon used in the first interferometric means 15 can be chosen so that the spectral range of the etalon corresponds approximately to the frequency difference between spectral components of a given periodic spectrum. Fine tuning of the solid etalon used in the first interferometric means 15 is affected by providing means for controlling the temperature, and hence the optical path length, thereof so as to cause the transmission peaks for adjacent orders to coincide with the components of the given periodic spectrum. The thickness of the etalon used in the second interferometric means 16 can be chosen so that the ratio of the spectral range of the first interferometric means 15 to the spectral range of the etalon is an odd integer greater than one. Fine tuning of the solid etalon used in the second interferometric means is affected by providing means for controlling the temperature, and hence the optical path length, thereof so as to cause the transmission peaks for adjacent nth orders to coincide with the spectral lines of the components of the given periodic spectrum. As previously noted, the light 14 to be analyzed need not be Raman scattered light solely but can be any light from the visible, infrared or ultraviolet frequency regions which has spectral components periodic in frequency. The signal conditioning means 20 and the modulating means 42 can be separately combined with the apparatus, although their collective employment results in maximum sensitivity and is therefore preferred. Moreover, the increased sensitivity of the apparatus makes it especially suited for detection at distant locations of gaseous constituents present in the low parts per million range. Hence, the gaseous material need not be located within a sample compartment, but may instead be located at points distant from the apparatus 10, as in the order of up to about fifteen miles distance therefrom. Other similar modifications can be made which fall within the scope of the present invention. It is, accordingly, intended that all matter contained in the above description and shown in the accompanying drawings be interpreted as illustrative and not in a limiting sense.

In operation of the preferred apparatus, light 14 having spectral components periodic in frequency is collected, collimated and transmitted by light conditioning means 12 to first interferometric means 15. The first interferometric means 15 receives the light 14, selectively separates therefrom a preselected periodic spectrum, and sends the separated spectrum in the form of a fringe to the second interferometric means 16. The second interferometric means 16 receives the fringe, further separates the preselected periodic spectrum therefrom and transmits the spectrum in the form of a modified fringe which provides a detectable signal 18. A modulating means 42 operates to modulate the phase difference of the second interferometric means so as to vary the intensity of the modified fringe. The intensity variation of the modified fringe is detected by a phase sensitive detection means 52. The resultant signal from the phase sensitive detection means 52 is displayed by the indicating and recording means 54.

Having thus described the invention in rather full detail, it will be understood that these details need not be strictly adhered to but that various changes and modifications may suggest themselves to one skilled in the art, all falling within the scope of the present invention as defined by the subjoined claims.

We claim:

1. Apparatus for analyzing light having spectral components periodic in frequency, comprising:
   a. light conditioning means for collecting, collimating and transmitting said light;
   b. first interferometric means adapted to receive said light, selectively separate a preselected periodic spectrum therefrom and transmit said spectrum in the form of a fringe, said first interferometric means having interference-producing means for providing a plurality of transmission windows regularly spaced in frequency, the frequency spacing between adjacent windows being adjusted to equal substantially the frequency difference between spectral components of the same periodic spectrum and to cause the transmission peaks for adjacent orders to coincide with the spectral lines of the components, whereby said fringe has an intensity derived from and substantially equal to the combined intensities of said spectral lines; and
   c. second interferometric means in series with said first interferometric means and adapted to receive said fringe and transmit spectra thereof in the form of a modified fringe providing a detectable signal, said second interferometric means having interference-producing means for providing a plurality of transmission windows regularly spaced in frequency, the frequency spacing between adjacent windows being adjusted so that (1) the ratio of the frequency spacing between adjacent windows of the first interferometric means to the corresponding frequency spacing between adjacent windows of the second interferometric means is an odd integer, n, greater than one and (2) the transmission peaks for adjacent nth orders coincide with the spectral lines of the components, whereby the proportion of intensity of said modified fringe derived from the combined intensities of said spectral lines of said spectrum is greater than that of said fringe.

2. Apparatus for analyzing light having spectral components periodic in frequency, comprising:
   a. light conditioning means for collecting, collimating and transmitting said light;
   b. first interferometric means adapted to receive said light and transmit a preselected periodic spectrum in the form of a fringe, said first interferometric means having interference-producing means for providing a plurality of transmission windows regularly spaced in frequency, the frequency spacing between adjacent windows being adjusted to equal substantially an odd integral submultiple, $n_1$, of the frequency difference between spectral components of the same periodic spectrum and to cause the transmission peaks for adjacent $n_1$th orders to coincide with the spectral lines of the components, whereby said fringe has an intensity derived in part from the combined intensities of said spectral lines; and
   c. second interferometric means in series with said first interferometric means and adapted to receive said fringe and transmit said spectrum thereof in the form of a modified fringe providing a detectable signal, said second interferometric means having interference-producing means for providing a plurality of transmission windows regularly spaced in frequency, the frequency spacing between adjacent windows being adjusted to equal substantially an odd integral submultiple, $n_2$, of the frequency difference between spectral components of said periodic spectrum, the ratio of the frequency spacing between adjacent windows of the first interferometric means to the corresponding frequency spacing between adjacent windows of the second interferometric means being a ratio of odd integers, $r = (n_2/n_1)$, and the transmission peaks for each $n_2$th interval of orders coinciding with the spectral lines of the components, whereby the proportion of intensity of said modified fringe derived from the combined intensities of said spectral lines of said spectrum is greater than that of said fringe.

3. Apparatus as recited in claim 2, including light source means for generating monochromatic light and projecting means for directing said monochromatic light through gaseous material to produce scattered light having said spectral components periodic in frequency.

4. Apparatus as recited in claim 2, including detecting means for indicating the intensity of said signal.

5. Apparatus as recited in claim 4, including signal conditioning means comprising modulating means for modulating the phase difference between interfering rays of said light so as to vary the intensity of the modified fringe, the modulating range being no greater than the frequency spacing between adjacent orders of said modified fringe, and synchronous detection means for detecting the intensity variation of said modified fringe, whereby said modified fringe can be identified.

6. Apparatus as recited in claim 5 wherein said modulating means has a modulating range of about one half the frequency width of said modified fringe.

7. Apparatus as recited in claim 4, including indicating and recording means for displaying said signal.

8. Apparatus as recited in claim 5 wherein said modulating means is a piezoelectric cylinder and said synchronous detection means is a phase sensitive detection system.

9. Apparatus as recited in claim 3 wherein said light source means is provided with means for projecting light having a line width and frequency stability about equal to or less than the instrumental width of said first interferometric means.

10. Apparatus as recited in claim 3 wherein said light source means is a pulsed laser.

11. Apparatus as recited in claim 10 wherein said laser is associated with a time gated electronic detection system having (1) means for measuring the time interval required to send a pulse from said laser into a sample of said gaseous material and receive a return signal caused by light scattered therein and (2) means for measuring the amplitude of said return signal.

12. Apparatus as recited in claim 2 wherein said preselected spectrum is the spectrum produced by Raman scattering of a minor constituent of a gaseous material.

13. Apparatus as recited in claim 12 wherein said gaseous material is air.

14. Apparatus as recited in claim 3 wherein said light source means is adapted to project plane polarized light and said apparatus includes polarizing means for receiving said scattered light and transmitting the light to said first interferometric means.

15. Apparatus as recited in claim 14 wherein said polarizing means is adapted to reduce the intensity of polarized Rayleigh scattered light to a degree described by the depolarization ratio thereof and to reduce the intensity of the Raman scattered light to a substantially smaller degree.

16. Apparatus as recited in claim 2 wherein at least one of said first and second interferometric means is a solid etalon having temperature control means associated therewith for adjusting the optical path length thereof.

17. Apparatus as recited in claim 8 including means for applying to said cylinder a voltage having a square wave form, the limits of said voltage being adjusted so that the intensity of said modified fringe alternates between its maximum and minimum values, means for determining for each cycle of said voltage the difference in photon count between said maximum and minimum values of said modified fringe to produce a signal count, and means for accumulating said signal count for a preselected period of time over a preselected number of cycles of said square wave.

18. Apparatus as recited in claim 17 including means for varying the preselected time period and the preselected number of cycles inversely with the intensity of said modified fringe.

19. Apparatus as recited in claim 8, wherein said phase sensitive detection system is a lock-in amplifier.

20. Apparatus as recited in claim 5 wherein said modulating means is a piezoelectric cylinder and said synchronous detection means is a photon counting system.

21. Apparatus as recited in claim 3, wherein said light source means includes signal conditioning means for varying the frequency of said monochromatic light to modulate the phase difference between interfering rays of said scattered light and vary the intensity of said modified fringe.

22. Apparatus as recited in claim 21, wherein said light source means is a tunable dye laser.

23. Apparatus as recited in claim 21, wherein said light source means is an optical parametric oscillator.

24. A method of spectroscopically analyzing light having spectral components periodic in frequency, comprising the steps of:
  a. collecting, collimating and transmitting said light;
  b. interferometrically separating a preselected periodic spectrum from said light and transmitting said spectrum in the form of a fringe having an intensity derived from and substantially equal to the combined intensities of said spectral components by directing said light through a first plurality of transmission windows regularly spaced in frequency, the frequency spacing between adjacent windows, or first spectral range, being equal substantially to the frequency difference between adjacent spectral components of the same periodic spectrum and the transmission peaks for adjacent orders coinciding with the spectral lines of the components;
  c. interferometrically separating said periodic spectrum from said fringe and transmitting said separated spectrum in the form of a modified fringe providing a detectable signal by directing said spectrum of said fringe through a second plurality of transmission windows regularly spaced in frequency, the frequency spacing between adjacent windows, or second spectral range, being such that (1) the ratio of the first spectral range to the second spectral range is an odd integer, n, greater than one and (2) the transmission peak for each nth interval of orders coincide with the spectral lines of the components, whereby the proportion of intensity of said modified fringe derived from the combined intensities of said spectral lines is greater than that of said fringe.

25. A method of spectroscopically analyzing light having spectral components periodic in frequency, comprising the steps of:
  a. collecting, collimating and transmitting said light;
  b. interferometrically transmitting a preselected periodic spectrum in the form of a fringe having an intensity derived from and substantially equal to the combined intensities of said spectral components by directing said light through a first plurality of transmission windows regularly spaced in frequency, the frequency spacing between adjacent windows, or first spectral range, being equal substantially to an odd integral submultiple, $n_1$, of the frequency difference between adjacent spectral components of the same periodic spectrum and the transmission peaks for adjacent orders coinciding with the spectral lines of the components;
  c. interferometrically separating said periodic spectrum from said fringe and transmitting said separated spectrum in the form of a modified fringe providing a detectable signal by directing said spectrum of said fringe through a second plurality of transmission windows regularly spaced in frequency, the frequency spacing between adjacent windows, or second spectral range, being equal substantially to an odd integral submultiple, $n_2$, of the frequency difference between spectral components of said periodic spectrum, the ratio of the first spectral range to the second spectral range being a ratio of odd integers, $r = (n_2/n_1)$, and the transmission peak for each $n_2$th interval of orders coinciding with the spectral lines of the components, whereby the proportion of intensity of said modified fringe derived from the combined intensities of said spectral lines of said spectrum is greater than that of said fringe.

26. Apparatus for analyzing light having spectral components periodic in frequency, comprising:
  a. light conditioning means for collecting, collimating and transmitting said light;
  b. second interferometric means adapted to receive said light and transmit spectra thereof in the form of a fringe;
  c. first interferometric means in series with said second interferometric means and adapted to receive said fringe, selectively separate a preselected periodic spectrum therefrom and transmit said spectrum in the form of a modified fringe, said first interferometric means having interference producing means for providing a plurality of transmission windows regularly spaced in frequency, the frequency spacing between adjacent windows being adjusted to equal substantially the frequency difference between spectral components of the same periodic spectrum and to cause the transmission peaks for adjacent orders to coincide with the spectral lines of the components, whereby said fringe has an intensity derived from and substantially equal to the combined intensities of said spectral lines; and d. said second interferometric means having interference-producing means for providing a plurality of transmission windows regularly spaced in frequency, the frequency spacing between adjacent windows being adjusted so that (1) the ratio of the frequency spacing between adjacent windows of the first interferometric means to the corresponding frequency spacing between adjacent windows of the second interferometric means is an odd integer, $n$, greater than one and (2) the transmission peaks for adjacent nth orders coincide with the spectral lines of the components, whereby the proportion of intensity of said modified fringe derived from the combined intensities of said spectral lines of said spectrum is greater that that of said fringe.

* * * * *